3,378,539
PROCESS AND CATALYST FOR PRODUCTION
OF SOLID POLYMERS
Gene Nowlin and Harold D. Lyons, Bartlesville, Okla.,
assignors to Phillips Petroleum Company, a corporation of Delaware
No Drawing. Filed July 28, 1955, Ser. No. 525,067
40 Claims. (Cl. 260—93.7)

This invention relates to the polymerization of olefins. In one aspect, this invention relates to an improved method for polymerizing olefins in the presence of a novel catalyst system.

Reactions for polymerizing olefins are well known in the art and are generally carried out in the presence of catalysts. One class of catalysts which has been used is organometal compounds, for example, triethylaluminum, in the polymerization of monoolefins, particularly ethylene, and the polymers which have been obtained in accordance with this method are generally liquid or low molecular weight solid polymers. Frequently, the polymers obtained are dimers or trimers of the olefin charged. The most valuable polymers, however, are higher molecular weight polymers which have desirable properties of heat stability and can be molded into vessels, pipes and tubing. Such uses cannot be made of the lower molecular weight polymers as, for example, a polymer having a molecular weight of about 2000 since the polymer of this molecular weight is a wax-like material.

The following are objects of this invention:

An object of this invention is to provide an improved process for the production of olefin polymers. A further object is to provide a novel catalyst for use in the production of olefin polymers. A still further object is to produce high molecular weight solid polymers of olefins, such as ethylene.

Other objects and advantages of this invention will become apparent to those skilled in the art upon consideration of the accompanying disclosure.

It has now been discovered that an unexpected improvement is obtained when an olefin such as ethylene is polymerized in the presence of a catalyst composition comprising a mixture of (1) a hydrocarbon derivative of a metal of Group IV, and (2) a halide of titanium, zirconium and hafnium of Group IV–A, or a complex salt of these halides with the halides of the alkali metals or ammonia, and (3) including in certain instances, a halide of aluminum, gallium, indium and thallium of Group III–B. These compounds are well known, and are described in the literature. They are preferably employed in the anhydrous or substantially anhydrous form. In certain cases it may be necessary to heat the compounds to convert the hydrated form to the anhydrous form. The use of various mixtures of components selected from each of the above three groups is also included within the scope of the invention. One of the most important advantages achieved by using the novel catalysts of this invention is that the polymerization reaction, particularly for ethylene, can be initiated and carried out at considerably lower temperatures and pressures than are necessary when employing the catalysts and processes of the prior art.

One of the components of our catalyst system is a hydrocarbon derivative of a metal selected from the group consisting of titanium, zirconium, hafnium, thorium, tin, lead and germanium of Group IV of the periodic system. These compounds can be represented by the formula $MR_4$, where M is one of the above defined metals and R is an alkyl, alkenyl, cycloalkyl, cycloalkenyl, aryl or a combination of these radicals such as aralkyl, alkylcycloalkyl and the like. The four R groups attached to the metal can be the same or different and can each contain from 1 to 12 carbon atoms, preferably from 1 to 6 carbon atoms. Examples of compounds falling within the scope defined above are tetraphenyltin, tetraethyltin, tetramethyltin, tetraisopropyltin, tetra-t-dodecyltin, diethyldiphenyltin, tetraethyllead, tetraphenyllead, tetra-n-propyllead, tetrabenzyllead, tetra(2-cyclohexenyl)titanium, tetraoctyltitanium, tetra-sec-hexyltitanium, tetrabutenyltitanium, tetracyclohexylzirconium, tetra(3-methylcyclohexyl)zirconium, tetra(2-phenylethyl)zirconium, diethyldimethylhafnium, tetraethylthorium, tetra-t-butylthorium, tetratolylgermanium, tetra(2-ethylcyclohexyl)germanium.

Another essential component of our catalyst system is a halide of titanium, zirconium or hafnium of Group IV–A or a complex salt of these halides with a halide of the alkali metals or ammonia. Examples of these halides are the tri- and tetrachlorides, tri- and tetrabromides, tri- and tetraiodides and tri- and tetrafluorides of the above named metals. Specific examples of these are titanium tetrachloride, titanium tetrabromide, titanium trichloride, titanium tribromide, titanium trifluoride, zirconium tetrachloride, zirconium tetrabromide, hafnium tetrachloride and hafnium tetrabromide. Examples of the complex halides include potassium fluotitanate ($K_2TiF_6$), potassium fluozirconate ($K_2ZrF_6$), lithium fluotitanate ($Li_2TiF_6$), potassium chlorozirconate ($K_2ZrCl_6$), cesium fluozirconate ($Cs_2ZrF_6$), ammonium chlorotitanate [$(NH_4)_2TiCl_6$], potassium fluohafniate ($K_2HfF_6$), and rubidium bromotitanate ($Rb_2TiBr_6$).

In addition to the two components named above it is desirable in certain instances to employ in addition a halide of aluminum, gallium, indium, or thallium of Group III–B. The addition of such a Group III–B metal halide appears to have a promoting or activating effect on the catalyst system. Such halides are generally used when tin compounds are employed in the catalyst system. Examples of these halides are aluminum trichloride, aluminum tribromide, aluminum trifluoride, aluminum triiodide, gallium tribromide, gallium dichloride, indium monobromide, indium trichloride, thallium tribromide, thallium monochloride, thallium trifluoride, and the like.

Preferred catalyst compositions include tetraphenyltin, titanium tetrachloride, and aluminum chloride; tetraethyllead and titanium tetrachloride; tetraethyllead, titanium tetrachloride, and aluminum chloride; tetraethyllead and zirconium tetrachloride; tetraethyllead and potassium fluotitanate; tetraethyltin and titanium tetrachloride; tetraphenyllead, titanium tetrachloride, and aluminum chloride; tetraethyltitanium and titanium tetrachloride; and tetraethylgermanium and titanium tetrachloride.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher.

The ratio of the amount of hydrocarbon derivative of the Group IV metal to the halide of the Group IV–A metal will usually be in the range of 0.05 to 50, preferably 0.1 to 5, moles of said hydrocarbon derivative of a Group IV metal per mole of a halide of the specified Group IV–A metals. When one of the Group III–B metal halides is employed it will be present in the range of 0.05 to 50, preferably 0.1 to 5 moles per mole of the specified Group IV–A metal halide.

The materials which are polymerized, in accordance with this invention, are polymerizable hydrocarbons, broadly. Preferably, the polymerizable hydrocarbons are olefins containing a $CH_2=C<$ radical. The most preferred class of polymerizable hydrocarbons used is 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the processes of the prior art mentioned above. Examples of other polymerizable hydrocarbons which can be used in the process of this invention are propylene, 1-butene, 1-hexene, and 1-octene. Branched chain olefins can also be used, such as isobutylene. Also, 1,1-dialkyl-substituted and 1,2-dialkyl-substituted ethylene can also be used. Examples of the di- and polyolefins in which the double bonds are in non-conjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of our novel catalyst as, for example, by copolymerizing ethylene and propylene, ethylene and 1-butene, propylene and 1-butene, or propylene and a penetene. Also, aryl olefins, e.g., styrene and alkyl-substituted styrenes can be polymerized to a solid polymer in the process of this invention.

The temperature at which polymerization of olefins in the presence of these catalysts can be carried out will vary over a rather broad range, such as from zero to 500° F., preferably from 100 to 350° F. Although pressures ranging from atmospheric up to 30,000 p.s.i.g. or higher can be employed, a pressure in the range of 100 to 1,000 p.s.i.g. is usually preferred.

In this connection, it is noted that it is preferred to carry out the reaction in the presence of an inert, organic diluent, preferably a hydrocarbon, with a pressure sufficient to maintain the diluent in the liquid phase, giving rise to a so-called "mixed-phase" system. However, the polymerization process of this invention proceeds in the gaseous phase without a diluent. The preferred pressure range set forth above has been found to produce solid polymers of olefins in excellent yields.

Suitable diluents for use in the polymerization process are paraffins, cycloparaffins, and/or aromatic hydrocarbons which are relatively inert, nondeleterious and liquid under the conditions of the process. The lower molecular weight alkanes, such as propane, butane, and pentane, are especially useful when the process is carried out at low temperatures. However, the higher molecular weight paraffins and cycloparaffins, such as isooctane, cyclohexane, and methylcyclohexane; and the aromatic diluents, such as benzene, toluene, and the like, can also be used, particularly when operating at higher temperatures. Halogenated hydrocarbons, such as halogenated aromatics, halogenated paraffins, halogenated cycloparaffins, etc. are also useful as diluents. Mixtures of any two or more of the above-named diluents can also be employed in this process.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends upon the temperature at which the process is carried out to a great extent. The residence time also varies with the specific olefin that is polymerized. However, the residence time for the polymerization of aliphatic monoolefins, within the preferred temperature range of 100 to 350° F., falls within the range of one second to an hour or more. In the batch process, the time for the reaction can vary widely, also, such as up to 24 hours or more.

Various materials are known to be poisons for the catalyst composition of this invention. These materials include carbon dioxide, oxygen and water. Therefore, it is usually desirable to free the polymerizable hydrocarbon from these materials, as well as from other materials which tend to inactivate the catalyst before contacting the hydrocarbon with the catalyst. Any suitable means for removing such contaminants can be employed. When a diluent is used in the process, this material should be freed of contaminants, such as water, oxygen, and the like. It is desirable, also, that air and moisture be removed from the reaction vessel before the reaction is carried out.

At the completion of the polymerization reaction the catalyst is killed or inactivated by any suitable means and the solid olefin polymer is separated from the diluent, washed with a suitable material and finally dried. Suitable wash materials include methyl alcohol, isopropyl alcohol, tert-butyl mercaptan, aniline, hydrochloric acid, sodium hydroxide and additional materials set forth in our copending application Ser. No. 499,650 filed Apr. 6, 1955 and now U.S. Patent 3,269,997. If desired, the product can be comminuted in a suitable grinder or the like during the purification and/or washing steps.

The following specific examples set forth actual operating conditions but should not be considered as unduly limiting.

Example I

Ethylene was polymerized in this run in a stainless steel autoclave of 1400 cc. capacity which is equipped with a propeller-type agitator, a thermowell, electrical heating elements, an internal baffle and two lines which can be used for charging or withdrawing reactants or products. One of these lines terminates at the inner surface of the autoclave cover and the second line extends into the lower portion of the reactor. It was this second line which was employed in this experiment for charging ethylene to the reaction zone. The ethylene was charged below the surface of the liquid phase present in the reactor. Prior to charging the catalyst and ethylene, the reactor was sealed and checked for possible leaks. When all leaks were eliminated, the reactor was flushed with prepurified nitrogen to remove oxygen, water vapor and other possible catalyst poisons. The catalyst components and solvent were then added to the reactor. At this point the reaction vessel was pressured with ethylene to about 50 p.s.i.g. and the ethylene was then vented to the atmosphere. This pressuring with ethylene and venting was repeated three times in order to flush the vapor space of any contaminating materials. At this point the agitator was started and ethylene were added until the desired pressure was reached. The ethylene feed was passed through a purification system comprising a pyrogallol solution, a sodium hydroxide solution, and drying agents to remove oxygen, carbon dioxide, and water vapor prior to entering the reactor.

In this run the catalyst consisted of three grams of tetraphenyltin and three grams of titanium tetrachloride. As the solvent, 400 cc. of cyclohexane (distilled from sodium) was used.

After the purging procedure described above was completed, the reactor was pressured with ethylene to about 300 p.s.i.g. with the temperature of the reaction mixture being approximately 90° F. Heating of the reactor was initiated at this point. After 15 minutes the temperature had increased to 168° F. and the pressure to about 500 p.s.i.g. After an additional 45 minutes, the temperature had increased to about 300° F. and the pressure had increased to about 700 p.s.i.g. The heating was discontinued and the reaction mixture was stirred overnight without any additional pressuring of ethylene or heating. Approximately 15 hours later the temperature was about 75° F. and the pressure was about 300 p.s.i.g. After bleeding off the ethylene, it was obvious that no polymer had been formed. At this point, one gram of anhydrous aluminum trichloride was added to the reaction mixture. The vapor space in the reactor was purged three times with ethylene as described above. The reactor was then repressured to about 300 p.s.i.g. at 75° F. and heating was initiated. After heating for about one hour and 7 minutes the temperature had increased to about 206° F. and the pressure was indicated as 600 p.s.i.g. After an additional 50 minutes the temperature had increased to 300° F. and the pressure had dropped to about 550 p.s.i.g. It was thus evident that the polymerization of ethylene had been initiated during this latter heating period. The temperature of the reaction mixture was then automatically conrolled to maintain a temperaure of approximately 300° F. for the remainder of the run. During the next four hours and 8 minutes the temperature varied in the range of about 298 to about 305° F. and the pressure dropped to about 425 p.s.i.g. At this point the polymerization reaction was terminated and the reactor was cooled with a water quench to room temperature. After the ethylene was vented, the reactor was opened and a slurry of reddish-brown solid in the solvent was recovered. Some polymer was also found to be adhering to the walls of the reactor. The total polymer and solvent were mixed with methyl alcohol and charged to a Waring Blendor. After the polymer was finely ground in the Waring Blendor, it was filtered from the liquid and dried overnight in a vacuum oven maintained at approximately 75° C. and a pressure of less than 10 mm. of mercury. About 20 grams of finely divided polymer of ethylene was recovered.

The physical properties of this polymer are as follows:

Melting point, ° F. _____ 252±2
Density, grams per cc. _____ 0.967
Inherent viscosity _____ (¹)
Moldability _____ Good
Color after molding _____ Dark brown ¹ Not determined because material was insoluble in Tetralin.

The polymer was tough and of relatively high molecular weight as indicated by its insolubility in Tetralin. Insolubility in Tetralin indicates a molecular weight in excess of 50,000 or 60,000.

Example II

Ethylene was polymerized in the same reactor and using the same general charging and purging procedure as described in Example I.

The catalyst system used in this reaction consisted of 3 cc. of tetraethyllead, 0.5 gram of anhydrous aluminum trichloride and one cc. of titanium tetrachloride. Four hundred cc. of cyclohexane treated as described in Example I was employed as a solvent.

After purging, the reactor was pressured to approximately 300 p.s.i.g. with ethylene with the reactants being at a temperature of about 100° F. Heating was initiated and the automatic temperature controller was set to maintain a temperature of 300±15° F. After heating for 73 minutes, the temperature had increased to about 260° F. and the pressure had increased to about 580 p.s.i.g. After an additional seven minutes heating, the temperature had increased to about 300° F. while pressure remained at approximately 580 p.s.i.g. It was thus evident that the polymerization reaction was initiated during this latter seven-minute heating period. After an additional 32-minute reaction period, the temperature was about 285° F. and the pressure had dropped to 350 p.s.i.g. At this point the reactor was pressured to about 550 p.s.i.g. The reaction continued for an additional 52 minutes, at the end of which time, the temperature was 290° F. and the pressure was 250 p.s.i.g. After an additional five hours and 23 minutes, the temperature was 290° F. and the pressure was 240 p.s.i.g. At this point heating was discontinued and the reactor was allowed to cool slowly. After 10 hours, the temperature was about 100° F. and the pressure in the reactor had dropped to zero p.i.s.g. The reaction mixture was added to methyl alcohol and this total mixture was charged to a Waring Blendor. After the polymer was finely divided in the Waring Blendor, it was filtered from the liquid and dried overnight in a vacuum oven maintained at about 75° C. and a pressure of less than 10 mm. of mercury. About 55 grams of a polymer of ethylene which was gray in color was obtained.

The physical properties of this polymer are as follows:

Density, grams/cc. _____ 0.998
Melting point, ° F. _____ 247±3
Inherent viscosity _____ 0.924
Molecular weight, based on inherent viscosity ___ 22,580
Melt index _____ 12.79
Molecular weight, based on melt index _____ 15,600
Color _____ Blue-gray Example III Ethylene was polymerized in the same reactor and using the same general charging and purging procedure as described in Example I.

The catalyst consisted of 3 cc. of tetraethyllead and 1 cc. of titanium tetrachloride. The solvent employed was 400 cc. of cyclohexane from the same source and treated in the same manner as described in Example I. After purging the reactor as described above, it was pressured with ethylene to approximately 300 p.s.i.g. The reaction mixture was at a temperature of 95° F. Heating was then initiated and the automatic temperature controller was set to maintain a temperature of 300±15° F. After 63 minutes of heating, the temperature had increased to about 260° F. and the pressure had increased to 640 p.s.i.g. The heating was continued for an additional 49 minutes at which time the temperature was approximately 285° F. and the pressure had dropped to 475 p.s.i.g. This drop in pressure indicated that the polymerization reaction had been initiated at some point during this latter heating period. The polymerization continued for 13 minutes, at the end of which time, the temperature was 290° F. and the pressure was approximately 425 p.s.i.g. The reactor was repressured to about 600 p.s.i.g. with ethylene and the reaction was allowed to continue for an additional period of one hour and 58 minutes. During this period, the temperature varied from 293 to 287 and the pressure gradually decreased to about 100 p.s.i.g. At this point, the reactor was repressured with ethylene to 300 p.s.i.g. and the reaction continued for an additional 44 minutes. At the end of this period, the temperature was 285° F. and the pressure had decreased to 200 p.s.i.g. Heating was discontinued and the reactor was cooled immediately with water. The mixture of polymer and solvent was added to methanol and the total was charged to a Waring Blendor. After the polymer was finely divided in the Waring Blendor, it was filtered from the liquid and dried in a vacuum oven maintained at about 75° C. and a pressure less than 10 mm. of mercury. Approximately 55 grams of a white polymer of ethylene were recovered.

The physical properties of this polymer are as follows:

Density, grams/cc. _____ 1.013
Melting point, ° F. _____ 246±3
Inherent viscosity _____ 0.942
Molecular weight, based on inherent viscosity ___ 23,020
Melt index _____ 10.05
Molecular weight, based on melt index _____ 16,129
Color _____ Light gray The tetraphenyltin was obtained from the City Chemical Company of New York city. The titanium tetrachloride and the aluminum trichloride were obtained from Fisher Scientific Company. The tetraethyllead was obtained from the Ethyl Corporation. The cyclohexane was Phillips' technical grade containing at least 95 mol percent cyclohexane. The ethylene was obtained from the Matheson Company, Inc., of Joliet, Ill., and had a purity of 99.5 weight percent.

As many possible embodiments may be made of this invention without departing from the scope thereof, it is

We claim:

1. A method for polymerizing a polymerizable hydrocarbon having at least three carbon atoms which comprises contacting said hydrocarbon at a pressure within the range of 100 to 1000 p.s.i.g. with a catalyst comprises contacting said hydrocarbon at a pressure within from the group consisting of titanium, zirconium, hafnium, thorium, tin, lead, and germanium of Group IV of the formula $MR_4$ where M is one of said metals and each R is individually selected from the group consisting of alkyl, alkenyl, cycloalkyl, cycloalkenyl, aryl, and combinations thereof, each R containing not to exceed 12 carbon atoms and (b) a halide of a metal selected from the group consisting of titanium, zirconium and hafnium of Group IV–A and complex alkali metal halide and ammonium halide salts of said halides.

2. The method of claim 1 wherein said compounds are present in an amount of from 0.05 to 50 moles of said hydrocarbon derivative of said Group IV metal per moles of said halide of said Group IV–A metal.

3. A method for polymerizing a polymerizable hydrocarbon which comprises contacting said hydrocarbon at a pressure within the range of 100 to 1000 p.s.i.g. with a catalyst comprising (a) a hydrocarbon derivative of a metal selected from the group consisting of titanium, zirconium, hafnium, thorium, tin, lead, and germanium of Group IV of the formula $MR_4$ where M is one of said metals and each R is individually selected from the group consisting of alkyl, alkenyl, cycloalkyl, cycloalkenyl, aryl, and combinations thereof, each R containing not to exceed 12 carbon atoms, (b) a halide of a metal selected from the group consisting of titanium, zirconium and hafnium of Group IV–A and complex alkali metal halide and ammonium halide salts of said halides, and (c) a halide of a metal selected from the group consisting of aluminum, gallium, indium, and thallium of Group III–B.

4. The method of claim 3 wherein, per mole of said halide of said Group IV–A metal, there are used 0.05 to 50 moles of said hydrocarbon derivative of said Group IV metal and 0.05 to 50 moles of said Group III–B metal halide.

5. The method of claim 3 wherein said polymerizable hydrocarbon is ethylene and said catalyst consists essentially of a mixture of tetraphenyltin, titanium tetrachloride, and aluminum trichloride.

6. The method of claim 3 wherein said polymerizable hydrocarbon is ethylene and said catalyst consists essentially of a mixture of tetraethyllead, titanium tetrachloride, and aluminum trichloride.

7. The method of claim 1 wherein said polymerizable hydrocarbon is propylene and said catalyst consists essentially of a mixture of tetraethyllead and titanium tetrachloride.

8. A catalyst composition comprising (a) a hydrocarbon derivative of a Group IV metal selected from the group consisting of titanium, zirconium, hafnium, thorium, tin, and germanium, each hydrocarbon group attached to said metal containing not more than 12 carbon atoms, and (b) a compound selected from the group consisting of metal halides of titanium, zirconium and hafnium of Group IV–A and complex salts of said halides with at least one compound selected from the group consisting of alkali metal halide and ammonium halides.

9. A catalyst composition comprising (a) a hydrocarbon derivative of a Group IV metal selected from the group consisting of titanium, zirconium, hafnium, thorium, tin, lead, and germanium, each hydrocarbon group attached to said metal containing not more than 12 carbon atoms, (b) a compound selected from the group consisting of metal halides of titanium, zirconium and hafnium of Group IV–A and complex salts of said halides with at least one compound selected from the group consisting of alkali metal halides and ammonium halides, and (c) a halogenated derivative of a metal selected from the group consisting of aluminum, gallium, indium, and thallium of Group III–B.

10. A catalyst composition consisting essentially of a mixture of tetraphenyltin, titanium tetrachloride, and aluminum trichloride.

11. A catalyst composition consisting essentially of a mixture of tetraethyllead, titanium tetrachloride, and aluminum trichloride.

12. A catalyst composition consisting essentially of a mixture of tetraethyllead and potassium fluotitanate.

13. A catalyst composition consisting essentially of a mixture of tetraethyltin and titanium tetrachloride.

14. A method for polymerizing a polymerizable hydrocarbon which comprises contacting said hydrocarbon at a temperature of 0 to 500° F. at a pressure of 100 to 1000 p.s.i.g. with a catalyst comprising (a) a hydrocarbon derivative of a metal selected from the group consisting of titanium, zirconium, hafnium, thorium, tin, and germanium of Group IV of the formula $MR_4$ where M is one of said metals and each R is individually selected from the group consisting of alkyl, alkenyl, cycloalkyl, cycloalkenyl, aryl, and combinations thereof, each R containing not to exceed 12 carbon atoms and (b) a halide of a metal selected from the group consisting of titanium, zirconium and hafnium of Group IV–A and complex alkali metal halide and ammonium halide salts of said halides, 0.05 to 50 moles of said hydrocarbon derivative being present per mole of said metal halide, the amount of said catalyst being 0.01 to 1 weight percent based on the monomer charged.

15. The method of claim 14 wherein said polymerizable hydrocarbon is ethylene.

16. A method for polymerizing a polymerizable hydrocarbon which comprises contacting said hydrocarbon at a temperature of 0 to 500° F. at a pressure of 100 to 1000 p.s.i.g. with a catalyst comprising (a) a hydrocarbon derivative of a metal selected from the group consisting of titanium, zirconium, hafnium, theorium, tin, lead, and germanium of Group IV of the formula $MR_4$ where M is one of said metals and each R is individually selected from the group consisting of alkyl, alkenyl, cycloalkyl, cycloalkenyl, aryl, and combinations thereof, each R containing not to exceed 12 carbon atoms, (b) a halide of a metal selected from the group consisting of titanium, zirconium and hafnium of Group IV–A and complex alkali metal halide and ammonium halide salts of said halides, and (c) a halide of a metal selected from the group consisting of aluminum, gallium, indium, and thallium of Group III–B, 0.05 to 50 moles of said Group IV metal compound and 0.05 to 50 moles of said Group III–B compound being present per mole of said Group IV–A metal halide, the amount of said catalyst being 0.01 to 1 weight percent based on the monomer charged.

17. The method of claim 16 wherein said polymerizable hydrocarbon is ethylene.

18. The method of claim 16 wherein the polymerizable hydrocarbon is ethylene and the catalyst components are tetraphenyltin, titanium tetrachloride and aluminum chloride.

19. The method of claim 16 wherein said polymerizable hydrocarbon is ethylene and the components of the catalyst system are tetraethyllead, titanium tetrachloride, and aluminum chloride.

20. A process for the conversion of a normally gaseous 1-olefin having at least three carbon atoms to a normally solid hydrocarbon material which process comprises contacting said olefin under polymerization conditions with a catalyst consisting essentially of the reaction product of tetraethyl lead and titanium tetrachloride.

21. The process for the polymerization of ethylene to form solid polymer which comprises polymerizing ethylene in the pressure of a catalyst mixture of a metal tetraalkyl wherein the metal is selected from the group consisting of tin and lead and the alkyl group contains not more than four carbon atoms, titanium tetrachloride and aluminum cholride.

22. A process for the polymerization of a normally gaseous 1-olefin containing at least 3 carbon atoms which process comprises contacting said olefin under polmerization conditions with a catalyst obtained by mixing tetraethyl lead and titanium tetrachloride.

23. In the polymerization of at least one monoolefin from the group consisting of ethylene and propylene to form solid polymer, the improvement which comprises effecting the polymerization in dispersion in an inert organic liquid at a temperature of from 0° C. to 130° C. and in the presence of a catalytic mixture of aluminum trihalide, tetraalkyl lead wherein each alkyl group contains 1–12 carbon atoms, and titanium tetrachloride, the mole ratios of the components of said mixture to each other being in the range of from 1:4 to 4:1.

24. In the polymerization of at least one monoolefin from the group consisting of ethylene and propylene to form solid polymer, the improvement which comprises effecting the polymerization in dispersion in an inert organic liquid at a temperature of from 0° C. to 130° C. and in the presence of a catalytic mixture of aluminum trihalide, tetraalkyl lead wherein each alkyl group contains 1–12 carbon atoms, and titanium tetrabromide, the mole ratios of the components of said mixture to each other being in the range of from 1:4 to 4:1.

25. In the polymerization of at least one monoolefin from the group consisting of ethylene and propylene to form solid polymer, the improvement which comprises effecting the polymerization in dispersion in an inert organic liquid at a temperature of from 0° C. to 130° C. and in the presence of a catalytic mixture of aluminum trihalide, tetraalkyl tin wherein each alkyl group contains 1–12 carbon atoms and titanium tetrachloride, the mole ratios of the components of said mixture to each other being in the range of from 1:4 to 4:1.

26. In the polymerization of at least one monoolefin from the group consisting of ethylene and propylene to form solid polymer, the improvement which comprises effecting the polymerization in dispersion in an inert liquid hydrocarbon at a temperature from 0° C. to 80° C. and in the presence of a catalytic mixture of substantially equimolar proportions of aluminum trichloride, tetraethyl lead, and titanium tetrachloride.

27. In the polymerization of at least one monoolefin from the group consisting of ethylene and propylene, to form solid polymer, the improvement which comprises effecting the polymerization in dispersion in an inert liquid hydrocarbon at a temperature of from 0° C. to 80° C. and in the presence of a catalytic mixture of substantially equimolar proportions of aluminum trichloride, tetraethyl lead and titanium tetrabromide.

28. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of aluminum trihalide, tetraalkyl lead wherein each alkyl group contains 1–12 carbon atoms and titanium tetrachloride, maintaining said polymerization mixture in said zone in liquid dispersion at a substantially constant temperature in the range of from 0° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process, the mole ratios of the components of said mixture to each other being in the range of from 1:4 to 4:1.

29. The process which comprises progressively and continuously introducing a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of aluminum trihalide, tetraalkyl tin wherein each alkyl group contains 1–12 carbon atoms and titanium tetrachloride, maintaining said polymerization mixture in said zone in liquid dispersion at a substantially constant temperature in the range of from 0° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process, the mole ratios of the components of said mixture to each other being in the range of from 1:4 to 4:1.

30. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of aluminum trichloride, tetraethyl lead and titanium tetrachloride, maintaining said polymerization mixture in said zone in liquid dispersion at a substantially constant temperature in the range of from 0° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various component in said zone remain substantially unchanged during said process.

31. The process which comprises progressively and continuously introducing into a poylmerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of aluminum trichloride, tetraethyl tin and titanium tetrachloride, maintaining said polymerization mixture in said zone in liquid dispersion at a substantially constant temperature in the range of from 0° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process.

32. The process which comprises progressively and continuously introducing into a polymerization zone at a substantially constant rate a polymerization mixture of substantially constant composition comprising an inert liquid hydrocarbon vehicle, at least one α-monoolifin from the group consisting of ethylene and propylene in a concentration soluble in said vehicle, and a catalytic mixture of substantially equimolar proportions of aluminum trichloride, tetraethyl lead, and titanium tetrabromide, maintaining said polymerization mixture in said zone in liquid dispersion at a substantially constant temperature in the range of from 0° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process.

33. The process for the polymerization of ethylene to form solid polymer which comprises polymerizing ethylene in the presence of a catalyst mixture of a metal tetraalkyl wherein the metal is selected from the group consisting of tin and lead and the alkyl group contains not more than four carbon atoms, titanium tetrachloride and aluminum chloride.

34. A method for polymerizing a polymerizable hydrocarbon which comprises contacting said hydrocarbon under polymerization conditions with a catalyst consisting essentially of a mixture of tetraethyllead and potassium fluotitanate.

35. A method for polymerizing a polymerizable hydrocarbon which comprises contacting said hydrocarbon under polymerization conditions with a catalyst consisting essentially of a mixture of tetraethyltin and titanium tetrachloride.

36. A method for polymerizing a polymerizable hydrocarbon which comprises contacting said hydrocarbon under polymerization conditions with a catalyst comprising (a) a hydrocarbon derivative of a metal selected from the group consisting of titanium, zirconium, hafnium, thorium, tin, and germanium of Group IV of the formula $MR_4$ where M is one of said metals and each R is individually selected from the group consisting of alkyl, alkenyl, cycloakyl, cycloalkenyl, aryl, and combinations thereof, each R containing not to exceed 12 carbon atoms and (b) a halide of a metal selected from the group consisting of titanium, zirconium, and hafnium of Group IV-A and complex alkali metal halide and ammonium halide salts of said halides.

37. The method of claim 36 wherein said polymerizable hydrocarbon is an aliphatic 1-olefin having up to and including eight carbon atoms.

38. The method of claim 36 wherein said polymerizable hydrocarbon is ethylene.

39. A method for polymerizing a polymerizable hydrocarbon having at least three carbon atoms which comprises contacting said hydrocarbon at a temperature of 0 to 500° F. at a pressure of 100 to 1000 p.s.i.g. with a catalyst comprising (a) a hydrocarbon derivative of a metal selected from the group consisting of titanium, zirconium, hafnium, thorium, tin, lead, and germanium of Group IV of the formula $MR_4$ where M is one of said metals and each R is individually selected from the group consisting of alkyl, alkenyl, cycloalkyl, cycloalkenyl, aryl, and combinations thereof, each R containing not to exceed 12 carbon atoms and (b) a halide of a metal selected from the group consisting of titanium, zirconium and hafnium of Group IV-A and complex alkali metal halide and amonium halide salts of said halides, 0.05 to 50 moles of said hydrocarbon derivative being present per mole of said metal halide, the amount of said catalyst being 0.01 to 1 weight percent based on the monomer charged.

40. The method of claim 39 wherein said polymerizable hydrocarbon is propylene and wherein the components of the catalyst system are tetraethyllead and titanium tetrachloride.

References Cited

UNITED STATES PATENTS

| 2,388,178 | 10/1945 | Peterson | 260—94.9 |
| 2,396,920 | 3/1946 | Larson | 260—94.9 |
| 2,439,765 | 4/1948 | Walker | 252—431 |
| 2,542,610 | 2/1951 | Young | 252—429 |
| 2,409,996 | 10/1946 | Roedel | 260—94.9 |
| 2,721,189 | 10/1955 | Anderson et al. | 260—94.9 |
| 2,786,036 | 3/1957 | Freimiller | 260—94.9 |

FOREIGN PATENTS

| 533,362 | 5/1955 | Belgium. |
| 538,782 | 12/1955 | Belgium. |
| 547,618 | 11/1956 | Belgium. |

JOSEPH L. SCHOFER, *Primary Examiner.*

MILTON STERMAN, A. M. BOETTCHER, B. E. LANHAM, L. H. GASTON, M. LIEBMAN, J. R. LIBERMAN, *Examiners.*

H. N. BURSTEIN, W. J. VAN BALEN, J. C. LAPRADE, M. B. KURTZMAN, S. ASTOR, F. L. DENSON, *Assistant Examiners.*

UNITED STATES PATENT OFFICE
CERTIFICATE OF CORRECTION

Patent No. 3,378,539                                  April 16, 1968

Gene Nowlin et al.

It is certified that error appears in the above identified patent and that said Letters Patent are hereby corrected as shown below:

Column 7, lines 7 and 8, "comprises contacting said hydrocarbon at a pressure within" should read -- comprising (a) a hydrocarbon derivative of a metal selected --. Column 8, line 42, "theorium" should read -- thorium --. Column 9, lines 4 and 5, cancel "selected from the group consisting of tin and lead"; line 5, before "and the" insert -- tin --; line 7, "cholride" should read -- chloride --. Column 10, line 6, after "introducing" insert -- into --; line 30, "monolefin" should read -- monoolefin --; line 43, "component" should read -- components --; line 46, "poylmerization" should read -- polymerization --; line 68, "monoolifin" should read -- monoolefin --. Column 11, line 8, "proces" should read -- process --. Column 12, line 13, "amonium" should read -- ammonium --.

Signed and sealed this 9th day of December 1969.

(SEAL)
Attest:

EDWARD M. FLETCHER, JR.                        WILLIAM E. SCHUYLER, JR.
Attesting Officer                                        Commissioner of Patents